United States Patent
Chiang

(10) Patent No.: US 10,075,894 B2
(45) Date of Patent: Sep. 11, 2018

(54) WIRELESS MICROPHONE SYSTEM

(71) Applicant: MASCOT ELECTRIC CO., LTD., Tainan (TW)

(72) Inventor: Kun-Tien Chiang, Tainan (TW)

(73) Assignee: MASCOT ELECTRIC CO., LTD., Tainan (TW)

( * ) Notice: Subject to any disclaimer, the term of this patent is extended or adjusted under 35 U.S.C. 154(b) by 0 days.

(21) Appl. No.: 15/496,278

(22) Filed: Apr. 25, 2017

(65) Prior Publication Data

US 2018/0184356 A1 Jun. 28, 2018

(30) Foreign Application Priority Data

Dec. 23, 2016 (TW) .............................. 105143049 A

(51) Int. Cl.
| | |
|---|---|
| *H04B 3/00* | (2006.01) |
| *H04R 3/00* | (2006.01) |
| *H04W 40/16* | (2009.01) |
| *H04B 1/3827* | (2015.01) |
| *H04W 24/08* | (2009.01) |
| *H04B 17/345* | (2015.01) |
| *H04R 27/00* | (2006.01) |
| *H04R 3/04* | (2006.01) |
| *H04R 1/24* | (2006.01) |
| *H04R 29/00* | (2006.01) |

(52) U.S. Cl.
CPC .......... *H04W 40/16* (2013.01); *H04B 1/3833* (2013.01); *H04B 17/345* (2015.01); *H04R 3/04* (2013.01); *H04R 27/00* (2013.01); *H04W 24/08* (2013.01); *H04R 1/245* (2013.01); *H04R 29/004* (2013.01); *H04R 2420/07* (2013.01)

(58) Field of Classification Search
CPC ........ H04R 1/222; H04R 1/245; H04R 1/265; H04R 1/326; H04R 1/342; H04R 3/04; H04R 3/005; H04R 29/004; H04R 29/007; H04R 2420/07
USPC ............... 381/315, 26, 91, 92, 122, 95, 310, 381/111–114, 80, 81, 123; 455/41.2, 63.1
See application file for complete search history.

(56) References Cited

U.S. PATENT DOCUMENTS

| | | | | |
|---|---|---|---|---|
| 5,881,156 A | * | 3/1999 | Treni ..................... | H04R 1/406 379/202.01 |
| 5,999,801 A | * | 12/1999 | Johnson ............... | H04B 1/3822 379/428.04 |
| 6,731,762 B1 | * | 5/2004 | Chiang ................... | H04R 9/08 381/111 |

(Continued)

*Primary Examiner* — Xu Mei
(74) *Attorney, Agent, or Firm* — McClure, Qualey & Rodack, LLP

(57) ABSTRACT

A wireless microphone system includes a microphone and a receiver. The microphone converts sound into audio data, and wirelessly transmits a carrier signal that contains the audio data via a microphone channel. The receiver receives the carrier signal via a receiver channel that matches the microphone channel, and automatically and repeatedly sweeps a plurality of wireless channels. The receiver selects at least one wireless channel that is free of interference to serve as a communication channel, transmits to the microphone a channel switching instruction for causing the microphone to set the communication channel as the microphone channel, and sets the communication channel as the receiver channel.

3 Claims, 3 Drawing Sheets

(56) References Cited

U.S. PATENT DOCUMENTS

| | | | | |
|---|---|---|---|---|
| 7,551,894 | B2* | 6/2009 | Gerber | H04R 25/554 |
| | | | | 381/122 |
| 8,380,131 | B2* | 2/2013 | Chiang | H04B 1/20 |
| | | | | 381/311 |
| 9,094,753 | B2* | 7/2015 | Kung | H04R 1/04 |
| 9,307,317 | B2* | 4/2016 | Chang | H04R 3/00 |
| 9,628,906 | B2* | 4/2017 | Chowdary | H02J 7/0055 |
| 2006/0121931 | A1* | 6/2006 | Lin | H04B 1/1027 |
| | | | | 455/550.1 |
| 2008/0187141 | A1* | 8/2008 | Wang | H04B 1/3827 |
| | | | | 381/3 |
| 2009/0052713 | A1* | 2/2009 | Abe | H04R 1/083 |
| | | | | 381/355 |
| 2013/0223653 | A1* | 8/2013 | Chang | H04R 3/00 |
| | | | | 381/122 |
| 2015/0189456 | A1* | 7/2015 | Chen | H04K 3/822 |
| | | | | 381/58 |

* cited by examiner

WIRELESS MICROPHONE SYSTEM

CROSS-REFERENCE TO RELATED APPLICATION

This application claims priority of Taiwanese Patent Application No. 105143049, filed on Dec. 23, 2016.

FIELD

The disclosure relates to a microphone system, and more particularly to a wireless microphone system.

BACKGROUND

Recently, wireless communication technology has been applied in various fields, such as to wireless microphone systems. Some wireless microphone systems provide multiple wireless channels so that users may adjust to or select a desired channel (e.g., a wireless channel that is free of interference) for communication between a microphone transmitter and a receiver, or multiple microphones may be used with the same receiver at the same time.

When the wireless channel currently used by a conventional wireless microphone system is interfered or occupied, which causes imperfection of a carrier signal carrying sound data, users may have to manually adjust and rematch the wireless channels used by the microphone and the receiver, interrupting speech of the users.

SUMMARY

Therefore, an object of the disclosure is to provide a wireless microphone system that may automatically avoid interference so as to enhance convenience of use.

According to the disclosure, the wireless microphone system includes a microphone and a receiver. The microphone includes a pickup device for converting sound into audio data, and a first transceiver unit for wirelessly transmitting a carrier signal that contains the audio data via a microphone channel. The receiver includes a second transceiver unit for wirelessly receiving the carrier signal via a receiver channel when the receiver channel matches the microphone channel; a frequency sweeper unit for automatically and repeatedly sweeping a plurality of predetermined wireless channels; and a channel monitor unit coupled to the frequency sweeper unit for selecting from among the predetermined wireless channels, based on the sweeping of the frequency sweeper unit, at least one wireless channel that is free of interference to serve as a communication channel, and coupled to the second transceiver unit for wirelessly transmitting, to the microphone through the second transceiver unit, a channel switching instruction that contains a channel code corresponding to the communication channel, and for causing the second transceiver unit to set the communication channel as the receiver channel. The first transceiver unit sets the communication channel as the microphone channel according to the channel code contained in the channel switching instruction after receipt of the channel switching instruction.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
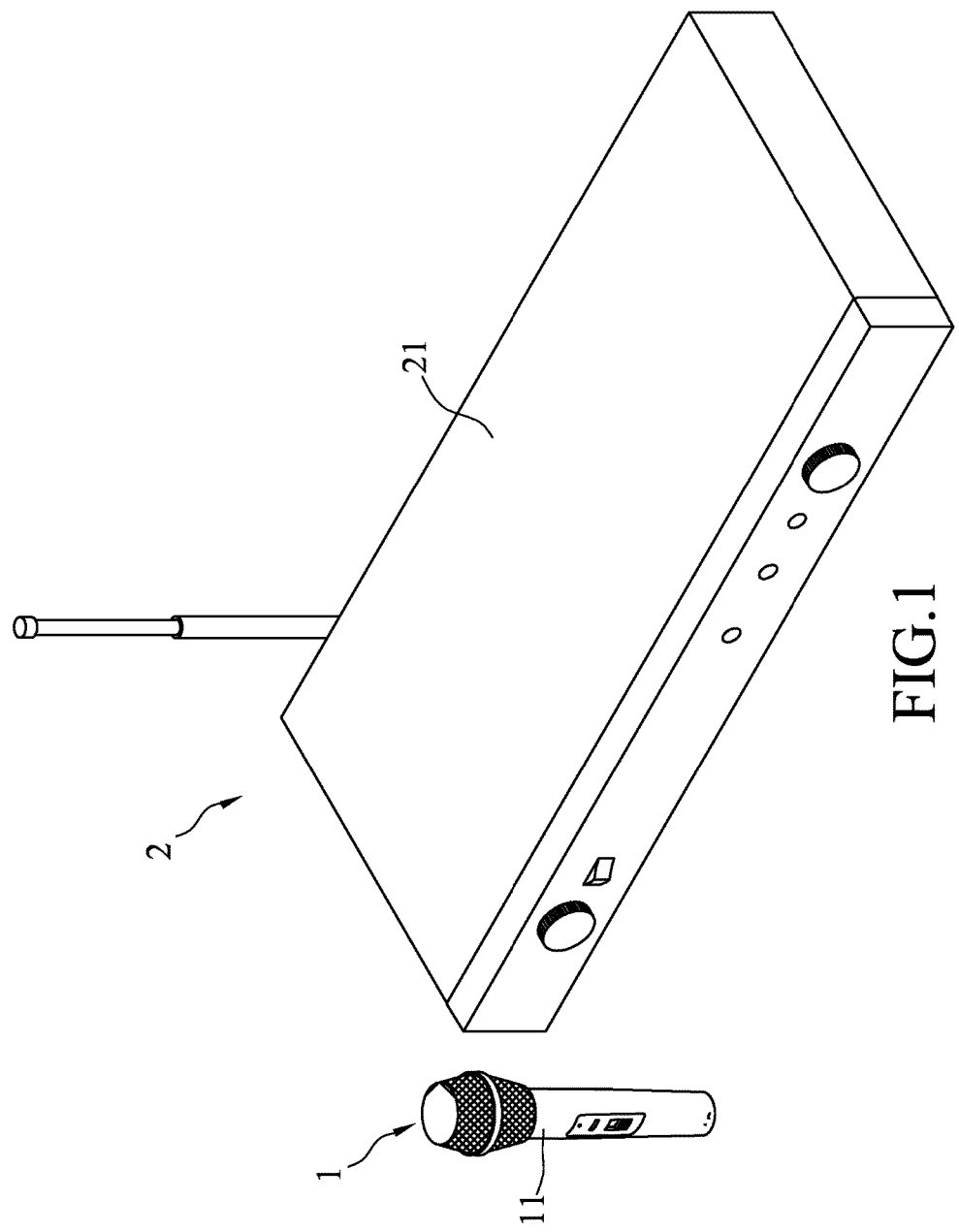
FIG. 1 is a schematic perspective view illustrating an embodiment of the wireless microphone system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
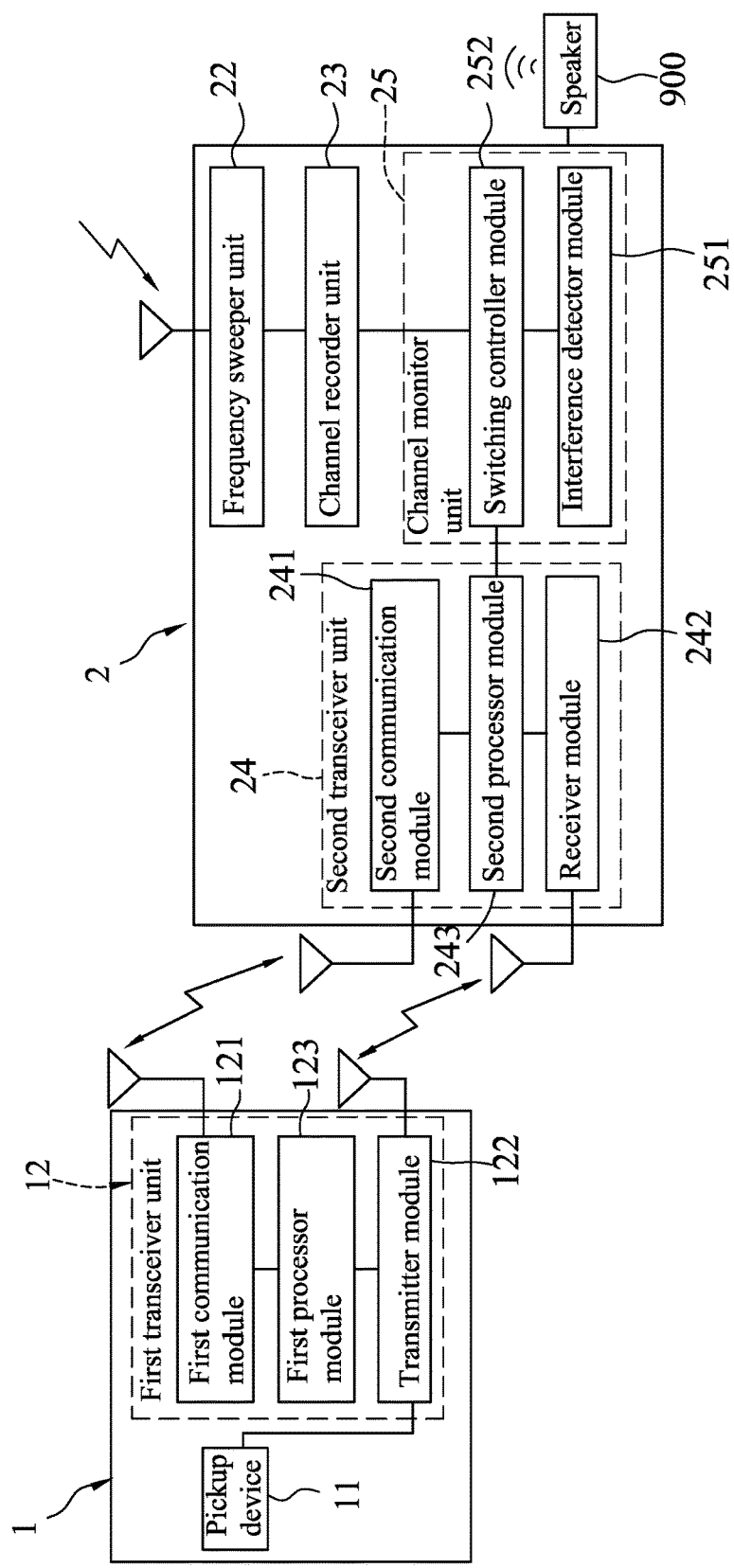
FIG. 2 is a block diagram illustrating the embodiment.
Figure 3:
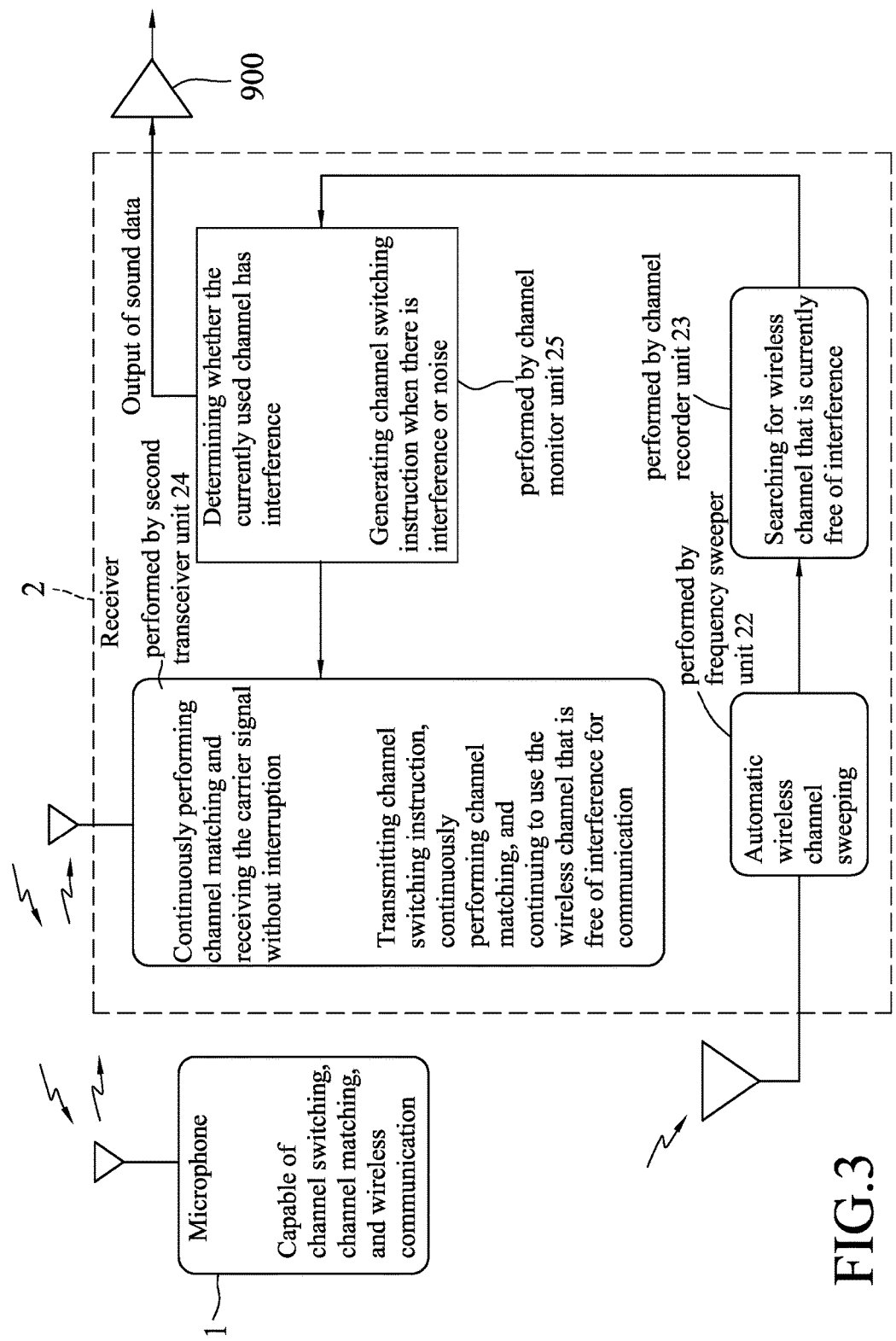
FIG. 3 is a block diagram illustrating operation of the embodiment.

Referring to FIGS. 1 to 3, the embodiment of the wireless microphone system according to this disclosure is shown to include a microphone 1, and a receiver 2 communicatively coupled to the microphone 1.

The microphone 1 includes a pickup device 11 configured to convert sound received thereby into audio data, and a first transceiver unit 12 configured to wirelessly communicate with the receiver 2. The structures, functions and designs of the pickup device 11 should be familiar to skilled persons in the art, and thus are not described herein for the sake of brevity.

The first transceiver unit 12 includes a first communication module 121, a transmitter module 122 and a first processor module 123. The first communication module 121 has a built-in wireless communication system, and is configured to perform wireless communication with the receiver 2 using a frequency band that falls within a range of, for example, between 2400 MHz and 2483.5 MHz (ISM/SRD band), but this disclosure is not limited thereto.

The transmitter module 122 is configured to add the audio data to a carrier signal by modulation, and to wirelessly transmit the carrier signal via a microphone channel. In this embodiment, the wireless microphone system has a plurality of predetermined wireless channels that respectively correspond to different frequencies and that are built in, for example, storage units (e.g., flash memories) of the microphone 1 and the receiver 2, and each of the wireless channels has a corresponding channel code. In this embodiment, the corresponding frequencies of the predetermined wireless channels fall within a range of, for example, between 2400 MHz and 2483.5 MHz, but this disclosure is not limited thereto. It is noted that the frequency of the microphone channel is not necessarily the same as that used by the first transceiver unit 12.

The first processor module 123 is coupled to the first communication module 121 and the transmitter module 122, and is operable to cause the transmitter module 122 to match the microphone channel with a receiver channel of the receiver 2, so that the transmitter module 122 is capable of wireless transmission of the carrier signal to the receiver 2 via the microphone channel that matches the receiver channel. When the first processor module 123 receives a channel switching instruction from the receiver 2 through the first communication module 121, the first processor module 123 controls, according to a channel code contained in the channel switching instruction, the transmitter module 122 to set one of the predetermined wireless channels that corresponds to the channel code contained in the channel switching instruction as the microphone channel via which the transmitter module 122 transmits the carrier signal.

The receiver 2 includes a housing 21, a frequency sweeper unit 22, a channel recorder unit 23, a second transceiver unit 24 and a channel monitor unit 25.

The frequency sweeper unit 22 is configured to automatically and continuously/repeatedly sweep all of the predetermined wireless channels when the microphone 1 and the receiver 2 are linked together (i.e., when the microphone channel and the receiver channel match each other), and the channel recorder unit 23 is coupled to the frequency sweeper unit 22 for recording, based on the sweeping of the frequency sweeper unit 22, wireless channels that are free of interference from among the predetermined wireless channels (i.e., one(s) of the predetermined wireless channels for which the detected interference is lower than a predetermined threshold).

The channel monitor unit 25 includes an interference detector module 251 and a switching controller module 252. The interference detector module 251 continuously detects whether or not the currently used receiver channel that matches the microphone channel has interference. The interference may result from occupation of the receiver/microphone channel by other devices or from electromagnetic signals from other electronic devices.

The switching controller module 252 is coupled to the interference detector module 251 and the channel recorder unit 23 for selecting at least one of the wireless channels that are recorded by the channel recorder unit 23 to be free of interference to serve as a communication channel, and generates the channel switching instruction that contains a channel code corresponding to the communication channel when the interference detector module 251 has detected that the currently used receiver channel has interference (i.e., the detected interference is higher than the predetermined threshold). The switching controller module 252 is further coupled to the second transceiver unit 24 for transmitting the channel switching instruction to the first communication module 121 of the microphone 1 therethrough and for causing the second transceiver unit 24 to set the communication channel as the receiver channel. When the interference detector module 251 detects that the currently used receiver/microphone channel is free of interference, the switching controller module 252 does not cause the second transceiver unit 24 to set the communication channel as the receiver channel and does not generate the channel switching instruction, so the second transceiver unit 24 continues to use the currently used receiver/microphone channel to communicate with the first transceiver unit 12, and to receive the carrier signal therethrough.

The second transceiver unit 24 includes a second communication module 241, a receiver module 242, and a second processor module 243 coupled to the second communication module 241 and the receiver module 242. The second communication module 241 has a built-in wireless communication system, and is configured to perform wireless communication with the first communication module 121 of the microphone 1 using the frequency band that falls within a range of, for example, between 2400 MHz and 2483.5 MHz (ISM/SRD band), but this disclosure is not limited thereto.

The receiver module 242 wirelessly receives the carrier signal from the transmitter module 122 via the receiver channel when the receiver channel matches the microphone channel.

The second processor module 243 is coupled to the second communication module 241 and the receiver module 242. When the interference detector module 251 has detected that the receiver channel has interference, the second processor module 243 transmits the channel switching instruction to the first communication module 121 of the microphone 1 through the second communication module 241, and causes the receiver module 242 to set the communication channel as the receiver channel via which the receiver module 242 receives the carrier signal.

In practice, the wireless microphone system of this disclosure may be used with a speaker 900. When the wireless microphone system is activated, the microphone 1 and the receiver 2 may be communicatively linked together automatically or manually, such that the receiver 2 is capable of receiving the carrier signal from the microphone 1, and audibly outputs the audio data contained in the carrier signal via the speaker 900. When the interference detector module 251 detects that the currently used receiver/microphone channel is free of interference, the microphone 1 and the receiver 2 continues to use the same receiver/microphone channel for transmission of the carrier signal. Once the interference detector module 251 detects that the currently used receiver/microphone channel has interference, the microphone 1 and the receiver 2 immediately switch to match the microphone channel and the receiver channel using another wireless channel that is free of interference (i.e., the communication channel) for continuing transmission of the carrier signal and avoiding affecting speech of the user.

In one embodiment, the microphone 1 may transmit a completion instruction to the receiver 2 after switching of the microphone channel for the first transceiver unit 12 is finished, and the receiver 2 executes switching of the receiver channel for the second transceiver unit 24 after receipt of the completion instruction. If the receiver 2 does not receive the completion instruction for a predetermined period, the receiver 2 may transmit the channel switching instruction again to the microphone 1 for ensuring switching of the microphone channel. However, such process is not necessary, and may be omitted in some embodiments.

In one embodiment, the receiver 2 may execute switching of the receiver channel for the second transceiver unit 24 before transmitting the channel switching instruction to the microphone 1.

In one embodiment, the interference detector module 251 and the channel recorder unit 23 may be omitted. Once the frequency sweeper unit 22 finds a wireless channel that is free of interference, the switching controller module 252 may directly cause that wireless channel to serve as the communication channel and transmits the corresponding channel switching instruction to the microphone 1, and causes the second transceiver unit 24 to set the communication channel as the receiver channel. As a result, the microphone 1 and the receiver 2 may communicate with each other using an interference-less wireless channel all the time.

In summary, by virtue of the frequency sweeper unit 22 that automatically and continuously/repeatedly sweeps the predetermined wireless channels, the microphone 1 and the receiver 2 of the wireless microphone system of this disclosure may automatically perform channel switching without manual operation when a currently used wireless channel has interference, resulting in better quality of the carrier signal and higher convenience in use.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A wireless microphone system comprising:

a microphone including a pickup device for converting sound into audio data, and a first transceiver unit for wirelessly transmitting a carrier signal that contains the audio data via a microphone channel; and a receiver including:

a second transceiver unit for wirelessly receiving the carrier signal via a receiver channel when the receiver channel matches the microphone channel;

a frequency sweeper unit for automatically and repeatedly sweeping a plurality of predetermined wireless channels;

a channel monitor unit coupled to said frequency sweeper unit for selecting from among the predetermined wireless channels, based on the sweeping of said frequency sweeper unit, at least one wireless channel that is free of interference to serve as a communication channel, said channel monitor unit being coupled to said second transceiver unit for wirelessly transmitting, to said microphone through said second transceiver unit, a channel switching instruction that contains a channel code corresponding to the communication channel, and for causing said second transceiver unit to set the communication channel as the receiver channel;

wherein said first transceiver unit sets the communication channel as the microphone channel according to the channel code contained in the channel switching instruction after receipt of the channel switching instruction;

wherein said channel monitor unit includes:

an interference detector module for detecting whether or not the receiver channel has interference;

a switching controller module coupled to said interference detector module for selecting the communication channel from among the predetermined wireless channels when said interference detector module has detected that the receiver channel has interference, said switching controller module being further coupled to said second transceiver unit for transmitting the channel switching instruction therethrough and for causing said second transceiver unit to set the communication channel as the receiver channel;

wherein said receiver further includes a channel recorder unit coupled to said frequency sweeper unit for recording, based on the sweeping of said frequency sweeper unit, wireless channels that are free of interference from among the predetermined wireless channels; and wherein said switching controller module is coupled to said channel recorder unit for selecting, based on the recording of said channel recorder unit, the communication channel from among the wireless channels recorded by said channel recorder unit when said interference detector module has detected that the receiver channel has interference.

2. The wireless microphone system of claim 1, wherein said second transceiver unit includes:

a communication module for transmitting the channel switching instruction to said microphone;

a receiver module for wirelessly receiving the carrier signal via the receiver channel when the receiver channel matches the microphone channel; and a processor module coupled to said communication module and said receiver module, wherein, when said interference detector module has detected that the receiver channel has interference, said processor module transmits the channel switching instruction to said microphone through said communication module, and causes said receiver module to set the communication channel as the receiver channel via which said receiver module receives the carrier signal.

3. The wireless microphone system of claim 1, wherein said first transceiver unit includes:

a communication module for receiving the channel switching instruction from said receiver;

a transmitter module for adding the audio data to the carrier signal, and for wirelessly transmitting the carrier signal via the microphone channel; and a processor module coupled to said communication module for receiving the channel switching instruction therethrough, and coupled to said transmitter module for controlling, according to the channel code contained in the channel switching instruction, said transmitter module to set the communication channel as the microphone channel via which said transmitter module transmits the carrier signal.

* * * * *